(12) United States Patent
Katagiri et al.

(10) Patent No.: US 11,940,635 B2
(45) Date of Patent: Mar. 26, 2024

(54) LIGHT DIFFUSION CONTROL BODY AND REFLECTIVE DISPLAY BODY

(71) Applicant: LINTEC CORPORATION, Tokyo (JP)

(72) Inventors: Baku Katagiri, Tokyo (JP); Kentaro Kusama, Tokyo (JP); Tatsuki Kuramoto, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 127 days.

(21) Appl. No.: 16/997,245

(22) Filed: Aug. 19, 2020

(65) Prior Publication Data

US 2021/0055459 A1 Feb. 25, 2021

(30) Foreign Application Priority Data

Aug. 20, 2019 (JP) ................. 2019-150541

(51) Int. Cl.
*G02B 5/02* (2006.01)
(52) U.S. Cl.
CPC .......... *G02B 5/0236* (2013.01); *G02B 5/0284* (2013.01)
(58) Field of Classification Search
CPC ...... G02B 5/02; G02B 5/0236; G02B 5/0284; G02B 5/0257; G02B 5/021; G02B 5/0278; G02B 5/0242; G02B 5/045; G02B 5/3083; G02B 27/095
USPC ............... 359/599, 601, 609, 613, 614, 742; 428/156, 163, 167, 168, 169, 172
See application file for complete search history.

(56) References Cited

U.S. PATENT DOCUMENTS

| | | | |
|---|---|---|---|
| 6,398,370 B1 * | 6/2002 | Chiu | G02B 5/003 428/167 |
| 2012/0250158 A1 | 10/2012 | Tamaki et al. | |
| 2016/0070140 A1 | 3/2016 | Tamaki et al. | |

(Continued)

FOREIGN PATENT DOCUMENTS

| | | | |
|---|---|---|---|
| JP | H05-214677 A | 8/1993 | |
| JP | H07-020319 A | 1/1995 | |

(Continued)

OTHER PUBLICATIONS

English translation of JP 2012141593, machine translated . (Year: 2012).*

(Continued)

*Primary Examiner* — Jie Lei
(74) *Attorney, Agent, or Firm* — Greenblum & Bernstein, P.L.C.

(57) ABSTRACT

A light diffusion control body includes at least two light diffusion control layers each having a regular internal structure. The regular internal structure includes a plurality of regions having a relatively high refractive index in a region having a relatively low refractive index. The at least two light diffusion control layers includes a first light diffusion control layer and a second light diffusion control layer each having a minimum value of a haze value of 35% or more. The haze value is measured when one surface of each of the first light diffusion control layer and the second light diffusion control layer is irradiated sequentially with a light ray at an incident angle of −70° to 70° with respect to the normal direction of the surface being 0°.

9 Claims, 9 Drawing Sheets

(56) References Cited

U.S. PATENT DOCUMENTS

| | | | |
|---|---|---|---|
| 2016/0077246 A1* | 3/2016 | Kusama | G02B 5/0278 |
| | | | 359/599 |
| 2017/0003422 A1 | 1/2017 | Sugiyama et al. | |
| 2019/0257957 A1 | 8/2019 | Shinji et al. | |

FOREIGN PATENT DOCUMENTS

| | | | | |
|---|---|---|---|---|
| JP | 2012141593 | * | 7/2012 | ............ G02B 5/02 |
| JP | 2013-037337 A | | 2/2013 | |
| JP | 5749960 | | 7/2015 | |
| WO | WO2015/111523 A1 | | 7/2015 | |
| WO | WO2017/221828 A1 | | 12/2017 | |

OTHER PUBLICATIONS

Office Action for counterpart Japanese Patent Application No. JP2019-150541 dated Apr. 4, 2023, and English translation thereof.
Office Action for counterpart Japanese Patent Application No. JP2019-150541 dated Sep. 5, 2023, and English translation thereof.

\* cited by examiner

Incident angle of 10°

Incident angle of 35°

LIGHT DIFFUSION CONTROL BODY AND REFLECTIVE DISPLAY BODY

TECHNICAL FIELD

The present invention relates to a light diffusion control body that can transmit and diffuse the incident light within a predetermined incident angle range in a strong and low light loss state and relates also to a reflective display body that includes the light diffusion control body.

BACKGROUND ART

Display bodies such as liquid crystal display devices, organic electroluminescence, and electronic paper are roughly classified into transmissive display bodies and reflective display bodies. The transmissive display body includes one or more light sources such as a backlight inside, and the viewer will visually recognize the display illuminated from behind by the light sources. On the other hand, the reflective display body does not include a light source such as a backlight, and utilizes indoor illumination existing outside and/or the sun or the like as a light source. The reflective display bodies also include those provided with a system that includes a light source for indirect illumination on the surface side of the display body and allows the viewer to visually recognize the display when the amount of light from the outside is insufficient, such as at night. The reflective display body usually includes a reflective plate inside. The reflective display body reflects the light from an external light source by the reflective plate and illuminates the display with the reflected light.

When using the reflective display body, the positional relationship between the light source and the viewer is not fixed due to the use of an external light source. This may result in a problems in that, depending on the position of the light source, insufficient light reaches the viewer to deteriorate the visibility and the entire display body cannot be illuminated brightly. To solve such a problem, it is conceivable to incorporate a light diffusion plate into the display body. However, simply incorporating a general light diffusion plate may lead to another problem in that the diffusivity necessary for good visibility cannot be sufficiently obtained and, if attempting to achieve high diffusion, light loss due to stray light or backscattering occurs to impair the image clarity. From the viewpoint of solving these problems, in the reflective display bodies, it is considered that a light diffusion control body that can transmit and diffuse the incident light within a predetermined incident angle range in a strong and low light loss state is provided between the surface on the viewer side and the reflective plate. The existence of the above light diffusion control body allows the light reflected from the reflective plate to be moderately diffused, and the deterioration in the visibility depending on the position of the light source can thus be reduced.

Patent Document 1 discloses a display device as the reflective display body including the light diffusion control body as described above. This display device includes a reflective display panel and an optical laminate arranged on the display panel. The optical laminate has a plurality of anisotropic scattering films. At least two films of the plurality of anisotropic scattering films have different transmission factors in the scattering center axis. The first film of the anisotropic scattering films included in the optical laminate has a relatively high transmission factor in the scattering center axis while the second film of the anisotropic scattering films included in the optical laminate has a relatively low transmission factor in the scattering center axis. The transmission factor of the first film in the scattering center axis is 4 times or more the transmission factor of the second film in the scattering center axis.

PRIOR ART DOCUMENTS

Patent Documents

[Patent Document 1] U.S. Pat. No. 5,749,960

SUMMARY OF THE INVENTION

Problems to be Solved by the Invention

In recent years, because of the expanding application field of the reflective display bodies such as liquid crystal display devices and electronic paper, higher visibility is required, or the performance which enables visual recognition even under a light source of more adverse conditions is required. As a result, the conventional reflective display bodies as disclosed in Patent Document 1 cannot satisfy the required performance, and light diffusion control bodies that can achieve more excellent visibility are demanded.

The present invention has been made in consideration of such actual circumstances and objects of the present invention include providing a light diffusion control body with which a display body having excellent visibility can be achieved and providing a reflective display body having excellent visibility.

Means for Solving the Problems

To achieve the above objects, first, the present invention provides a light diffusion control body comprising at least two light diffusion control layers each having a regular internal structure, the regular internal structure comprising a plurality of regions having a relatively high refractive index in a region having a relatively low refractive index, the at least two light diffusion control layers including a first light diffusion control layer and a second light diffusion control layer each having a minimum value of a haze value of 35% or more, the haze value being measured when one surface of each of the first light diffusion control layer and the second light diffusion control layer is irradiated sequentially with a light ray at an incident angle of −70° to 70° with respect to a normal direction of the surface being 0° (Invention 1).

The light diffusion control body according to the above invention (Invention 1) includes the first light diffusion control layer and the second light diffusion control layer each having the minimum value of the above-described haze value and can thereby diffuse light moderately. In the reflective display body including the light diffusion control body, therefore, it is possible to effectively use light rays that are incident more obliquely, and the visibility is excellent.

In the above invention (Invention 1), the first light diffusion control layer and the second light diffusion control layer may preferably have respective central axes of diffusion at different angles (Invention 2).

In the above invention (Invention 1, 2), the regular internal structure in at least one of the first light diffusion control layer and the second light diffusion control layer may preferably be a column structure configured such that a plurality of columnar bodies having the relatively high refractive index is densely arranged to stand in a film thickness direction in the region having the relatively low refractive index (Invention 3).

Second, the present invention provides a reflective display body comprising the light diffusion control body (Invention 1 to 3) and a reflective plate provided on one surface side of the light diffusion control body (Invention 4).

Advantageous Effect of the Invention

According to the light diffusion control body of the present invention, a display body having excellent visibility can be manufactured. In particular, a reflective display body having excellent visibility can be manufactured.

BRIEF DESCRIPTION OF DRAWINGS

FIG. 5-1 is a diagram illustrating a part of the results of Testing Example 2 (diffuse luminance distribution measurement for light diffusion control layers).

FIG. 5-2 is a diagram illustrating a part of the results of Testing Example 2 (diffuse luminance distribution measurement for light diffusion control layers).

FIG. 6-1 is a diagram illustrating a part of the results of Testing Example 3 (diffuse luminance distribution measurement for samples of reflective display bodies).

FIG. 6-2 is a diagram illustrating a part of the results of Testing Example 3 (diffuse luminance distribution measurement for samples of reflective display bodies).

FIG. 6-3 is a diagram illustrating a part of the results of Testing Example 3 (diffuse luminance distribution measurement for samples of reflective display bodies).

FIG. 6-4 is a diagram illustrating a part of the results of Testing Example 3 (diffuse luminance distribution measurement for samples of reflective display bodies).

EMBODIMENTS FOR CARRYING OUT THE INVENTION

Hereinafter, one or more embodiments of the present invention will be described.
<Light Diffusion Control Body>

Figure 1:
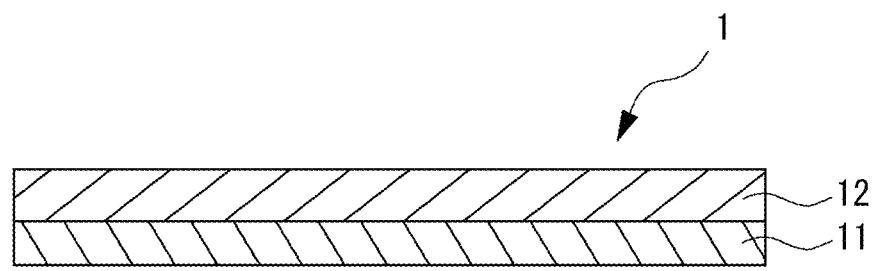
FIG. 1 is a cross-sectional view of a light diffusion control body according to an embodiment of the present invention.

FIG. 1 is a cross-sectional view of a light diffusion control body according to an embodiment of the present invention. Light diffusion control body 1 illustrated in FIG. 1 includes at least two light diffusion control layers each having a regular internal structure. The regular internal structure includes a plurality of regions having a relatively high refractive index in a region having a relatively low refractive index. Here, the above regular internal structure refers to an internal structure configured such that a plurality of regions having a relatively high refractive index is arranged with a predetermined regularity in a region having a relatively low refractive index (for example, an internal structure configured such that, when viewing a cross section obtained by cutting the light diffusion control layer along a plane parallel to the surface of the light diffusion control layer, that is, a cross section obtained by cutting the light diffusion control layer at a position at which the above regular internal structure exists, regions having a relatively high refractive index are repeatedly arranged at a similar pitch along at least one direction in the above cross section in a region having a relatively low index).

In particular, the light diffusion control body 1 illustrated in FIG. 1 includes a first light diffusion control layer 11 and a second light diffusion control layer 12 that is laminated on one surface side of the first light diffusion control layer 11. The light diffusion control body 1 according to the present embodiment may further include one or more light diffusion control layers in addition to the first light diffusion control layer 11 and the second light diffusion control layer 12. Additionally or alternatively, the light diffusion control body 1 may further include one or more layers in addition to the light diffusion control layers. The form of the light diffusion control body 1 is not particularly limited, provided that it includes the first light diffusion control layer 11 and the second light diffusion control layer 12. For example, the light diffusion control body 1 may be in a form of commonly-used members such as those incorporated in display bodies and, in particular, may preferably be in a film-like form. That is, the light diffusion control body 1 may preferably be a light diffusion control film.

In the light diffusion control body 1 according to the present embodiment, each of the first light diffusion control layer 11 and the second light diffusion control layer 12 has the minimum value of a haze value of 35% or more. The haze value is measured when one surface of each of the first light diffusion control layer 11 and the second light diffusion control layer 12 is irradiated sequentially with light rays at an incident angle of −70° to 70° with respect to the normal direction of the surface being 0°. Thus, the light diffusion control body 1 according to the present embodiment includes at least two light diffusion control layers each having the minimum value of the above haze value of 35% or more and can thereby moderately diffuse and transmit the light rays which are incident on the light diffusion control body 1 at a given angle. Thus, provided that a reflective display body is manufactured using the light diffusion control body 1 according to the present embodiment, even when the light is incident on the reflective display body at a relatively large incident angle (angle between the incident light and the normal line of the display surface of the reflective display body), the incident light can effectively reach the viewer after being reflected in the direction toward the viewer. As a result, the viewer can recognize the display brighter, that is, excellent visibility is achieved. Such excellent visibility is also achieved in a transmissive display body manufactured using the light diffusion control body 1 according to the present embodiment.

From the viewpoint of achieving more excellent visibility, the minimum value of the above-described haze value in at least one of the first light diffusion control layer 11 and the second light diffusion control layer 12 (preferably in both layers) may be preferably 40% or more, more preferably 50% or more, particularly preferably 60% or more, and further preferably 65% or more.

In at least one of the first light diffusion control layer 11 and the second light diffusion control layer 12 (preferably in both layers), the maximum value of the above-described haze value may be preferably 80% or more, more preferably 85% or more, particularly preferably 90% or more, and further preferably 95% or more. Thus, the maximum value of the above-described haze value may be as described above in at least one of the first light diffusion control layer and the second light diffusion control layer 12 (preferably in both layers), and clearer display can thereby readily reach the viewer.

The minimum and maximum values of the haze value as described above can be obtained by variable haze measurement using a variable haze meter or the like, and details of the method of measurement are as described in the testing example, which will be described later.

In the light diffusion control body 1 according to the present embodiment, the difference between the haze value of the first light diffusion control layer 11 and the haze value of the second light diffusion control layer 12 may be preferably less than 50 points, particularly preferably 30 points or less, further preferably 10 points or less, and still further preferably 5 points or less. Thus, the difference between the above haze values may be less than 50 points, and the first light diffusion control layer 11 and the second light diffusion control layer 12 can thereby readily have the minimum value of the above-described haze value. The lower limit of the difference between the above haze values is not particularly limited and may be, for example, 0.1 points or more in an embodiment, particularly 0.5 points or more in another embodiment, and further 1% point or more in still another embodiment. The haze value in the difference between the above haze values is the haze value measured when each light diffusion control layer is irradiated with light rays at an incident angle of 0°.

In the light diffusion control body 1 according to the present embodiment, the first light diffusion control layer and the second light diffusion control layer 12 may preferably have respective central axes of diffusion at different angles. This allows the light diffusion control body 1 according to the present embodiment to more readily disperse the light rays which are incident at a given angle. Accordingly, in the reflective display body including the light diffusion control body 1 according to the present embodiment, incident light having a relatively large incident angle may be readily reflected toward the viewer, that is, more excellent visibility can be achieved. The above central axis of diffusion refers to an axis at which the diffusion characteristics are substantially symmetrical with respect to the axis, and can be estimated based on the diffusion performance perceived by the variable haze measurement or the like for the light diffusion control layers. The detailed method of measurement is as described in the testing example, which will be described later.

From the viewpoint of more readily achieving excellent visibility, the angle formed by the central axis of diffusion of the first light diffusion control layer 11 and the central axis of diffusion of the second light diffusion control layer 12 may be preferably 1° or more, particularly preferably 5° or more, and further preferably 10° or more. Thus, the angle between the central axes of diffusion may be the above critical value or more, and the light diffusion control body 1 according to the present embodiment can thereby readily disperse the light rays which are incident at a given angle.

From another viewpoint, the angle formed by the central axis of diffusion of the first light diffusion control layer 11 and the central axis of diffusion of the second light diffusion control layer 12 may be preferably 40° or less, particularly preferably 30° or less, and further preferably 20° or less. Thus, the angle between the central axes of diffusion may be the above critical value or less, and the range in which the exiting light is effectively diffused can thereby readily overlap between the first light diffusion control layer 11 and the second light diffusion control layer 12. As a result, more excellent visibility can be readily achieved.

In the light diffusion control body 1 according to the present embodiment, when one surface of the first light diffusion control layer 11 is irradiated with light rays at an incident angle at which the incident light is most strongly diffused, the ratio between the maximum value of the light intensity of the diffused light transmitted to the other surface by the irradiation with the light rays and the maximum value of the light intensity of the diffused light similarly measured for the second light diffusion control layer 12 (ratio obtained by dividing a larger value by a smaller value) may be preferably less than 4 times, more preferably 3.5 times or less, further preferably 3 times or less, still further preferably 2 times or less, and most preferably 1.4 times or less. Thus, the above ratio may be less than 4 times, and the first light diffusion control layer 11 and the second light diffusion control layer 12 can thereby readily have the minimum value of the previously described haze value. On the other hand, the lower limit of the above ratio is not particularly limited and may be, for example, 1.00 times or more in an embodiment, particularly 1.01 times or more in another embodiment, and further 1.05 times or more in still another embodiment. The maximum value of the light intensity of the diffused light can be obtained, for example, by diffuse luminance distribution measurement for the light diffusion control layers using a diffuse luminance distribution measurement device, and details of the method of measurement are as described in the testing example, which will be described later.

1. Structure of Light Diffusion Control Layers

The first light diffusion control layer 11 and second light diffusion control layer 12 of the light diffusion control body according to the present embodiment are not particularly limited, provided that they each have the minimum value of the previously described haze value and a regular internal structure including a plurality of regions having a relatively high refractive index in a region having a relatively low refractive index. When the light diffusion control body according to the present embodiment further includes a light diffusion control layer in addition to the first light diffusion control layer 11 and the second light diffusion control layer 12, this further light diffusion control layer is not particularly limited, provided that it has a regular internal structure including a plurality of regions having a relatively high refractive index in a region having a relatively low refractive index.

Each of the first light diffusion control layer 11, the second light diffusion control layer 12, and the further light diffusion control layer may preferably be a layer obtained by curing a composition for light diffusion control layers that contains a high refractive index component and a low refractive index component having a refractive index lower than that of the high refractive index component. In particular, each of the high refractive index component and the low refractive index component may preferably have one or two polymerizable functional groups. The use of such a composition for light diffusion control layers allows the above-described regular internal structure to be readily and well formed, and when the first light diffusion control layer 11 and the second light diffusion control layer 12 are formed, adjustment of the haze value is easy, and as a result, the minimum value of the previously described haze value can readily be achieved.

(1) High Refractive Index Component

Preferred examples of the above high refractive index component include (meth)acrylic ester that contains an aromatic ring, and (meth)acrylic ester that contains a plurality of aromatic rings may be particularly preferred. Examples of (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, and benzylphenyloxyalkyl (meth)acrylate. Among these, biphenyl (meth)acrylate may be preferred from the viewpoint of readily forming a good regular internal structure. Specifically, o-phenylphenoxyethyl acrylate, o-phenylphenoxyethoxyethyl acrylate, or the like may be preferred. In the present specification, (meth)acrylic acid means both the acrylic acid and the methacrylic acid. The same applies to other similar terms.

The weight-average molecular weight of the high refractive index component may be preferably 2,500 or less, particularly preferably 1,500 or less, and further preferably 1,000 or less. From another aspect, the weight-average molecular weight of the high refractive index component may be preferably 150 or more, particularly preferably 200 or more, and further preferably 250 or more. When the weight-average molecular weight of the high refractive index component falls within the above range, the light diffusion control layers each having a desired regular internal structure can readily be formed, and the first light diffusion control layer 11 and the second light diffusion control layer 12 each having the minimum value of the previously described haze value can readily be formed. The weight-average molecular weight in the present specification refers to a value that is measured as a standard polystyrene equivalent value using the gel permeation chromatography (GPC) method.

The refractive index of the high refractive index component may be preferably 1.45 or more, more preferably 1.50 or more, particularly preferably 1.54 or more, and further preferably 1.56 or more. From another aspect, the refractive index of the high refractive index component may be preferably 1.70 or less, particularly preferably 1.65 or less, and further preferably 1.59 or less. When the refractive index of the high refractive index component falls within the above range, the light diffusion control layers each having a desired regular internal structure can readily be formed, and the first light diffusion control layer 11 and the second light diffusion control layer 12 each having the minimum value of the previously described haze value can readily be formed. The refractive index in the present specification means the refractive index of a given component before curing the composition for light diffusion control layers, and the refractive index is measured in accordance with JIS K0062: 1992.

The content of the high refractive index component in the composition for light diffusion control layers may be preferably 25 mass parts or more, particularly preferably 40 mass parts or more, and further preferably 50 mass parts or more with respect to 100 mass parts of the low refractive index component. From another aspect, the content of the high refractive index component in the composition for light diffusion control layers may be preferably 400 mass parts or less, particularly preferably 300 mass parts or less, and further preferably 200 mass parts or less with respect to 100 mass parts of the low refractive index component. When the content of the high refractive index component falls within such ranges, the regions derived from the high refractive index component and the region derived from the low refractive index component exist with a desired ratio in the regular internal structure formed in each of the light diffusion control layers formed. As a result, the light diffusion control layers each having a desired regular internal structure can readily be formed, and the first light diffusion control layer 11 and the second light diffusion control layer 12 each having the minimum value of the previously described haze value can readily be formed.

(2) Low Refractive Index Component

Preferred examples of the above low refractive index component include urethane (meth)acrylate, a (meth)acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may preferably be formed of (a) a compound that contains at least two isocyanate groups, (b) polyalkylene glycol, and (c) hydroxyalkyl (meth)acrylate.

Preferred examples of the above-described (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above-described (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 4,300 or more, and further preferably 6,300 or more. From another aspect, the weight-average molecular weight of the (b) polyalkylene glycol may be preferably 19,500 or less, particularly preferably 14,300 or less, and further preferably 12,300 or less.

Preferred examples of the above-described (c) hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. Among these, 2-hydroxyethyl methacrylate may be preferably used from the viewpoint of reducing the polymerization rate of the obtained urethane (meth)acrylate and more efficiently forming a predetermined regular internal structure.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5, particularly preferably a ratio of 1-3:1:1-3, and further preferably a ratio of 2:1:2.

The weight-average molecular weight of the low refractive index component may be preferably 3,000 or more, particularly preferably 5,000 or more, and further preferably 7,000 or more. From another aspect, the weight-average molecular weight of the low refractive index component may be preferably 20,000 or less, particularly preferably 15,000 or less, and further preferably 13,000 or less. When the weight-average molecular weight of the low refractive index component falls within the above range, the light diffusion control layers each having a desired regular internal structure can readily be formed, and the first light diffusion control layer 11 and the second light diffusion control layer 12 each having the minimum value of the previously described haze value can readily be formed.

The refractive index of the low refractive index component may be preferably 1.59 or less, more preferably 1.50 or less, particularly preferably 1.49 or less, and further preferably 1.48 or less. From another aspect, the refractive index of the low refractive index component may be preferably 1.30 or more, particularly preferably 1.40 or more, and particularly preferably 1.46 or more. When the refractive index of the low refractive index component falls within the above range, the light diffusion control layers each having a desired regular internal structure can readily be formed, and the first light diffusion control layer 11 and the second light diffusion control layer 12 each having the minimum value of the previously described haze value can readily be formed.

(3) Other Components

The previously described composition for light diffusion control layers may contain other additives in addition to the high refractive index component and the low refractive index component. Examples of other additives include a multifunctional monomer (compound having three or more polymerizable functional groups), a photopolymerization initiator, an antioxidant, an ultraviolet absorber, an antistatic, a polymerization accelerator, a polymerization inhibitor, an infrared absorber, a plasticizer, a diluting solvent, and a leveling agent.

The composition for light diffusion control layers may preferably contain a photopolymerization initiator among the above-described additives. When the composition for light diffusion control layers contains a photopolymerization initiator, the light diffusion control layers each having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone, or two or more types may also be used in combination.

When the photopolymerization initiator is used, the content of the photopolymerization initiator in the composition for light diffusion control layers may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the composition for light diffusion control layers falls within the above range, the light diffusion control layers can be readily and efficiently formed.

(4) Preparation of Composition for Light Diffusion Control Layers

The composition for light diffusion control layers can be prepared by uniformly mixing the previously described high refractive index component and low refractive index component and, if desired, other additives such as a photopolymerization initiator.

In the above mixing, a uniform composition for light diffusion control layers may be obtained by stirring it while heating it to a temperature of 40° C. to 80° C. A diluting solvent may be added and mixed so that the obtained composition for light diffusion control layers has a desired viscosity.

2. Regular Internal Structure of Light Diffusion Control Layers

As previously described, each of the light diffusion control layers in the present embodiment has a regular internal structure in its inside. The regular internal structure includes a plurality of regions having a relatively high refractive index in a region having a relatively low refractive index. More specifically, each of the light diffusion control layers in the present embodiment may have a regular internal structure in which a plurality of regions having a relatively high refractive index extends with a predetermined length in the film thickness direction in a region having a relatively low refractive index. Thus, the regular internal structure as referred to herein may have a feature that the regions having a relatively high refractive index extend in the film thickness direction, and this feature is distinguished from those of a phase-separation structure in which one phases exist in the other phase without clear regularity and a sea-island structure in which approximately spherical island components exist in a sea component.

A more specific example of the above-described internal structure may be a column structure configured such that a plurality of columnar bodies having a relatively high refractive index is densely arranged to stand in the film thickness direction in a region having a relatively low refractive index. In the first light diffusion control layer 11 and the second light diffusion control layer 12 in the present embodiment, it may be preferred to have a column structure as the regular internal structure from the viewpoint of readily achieving the minimum value of the previously described haze value.

(1) Column Structure

Figure 2:
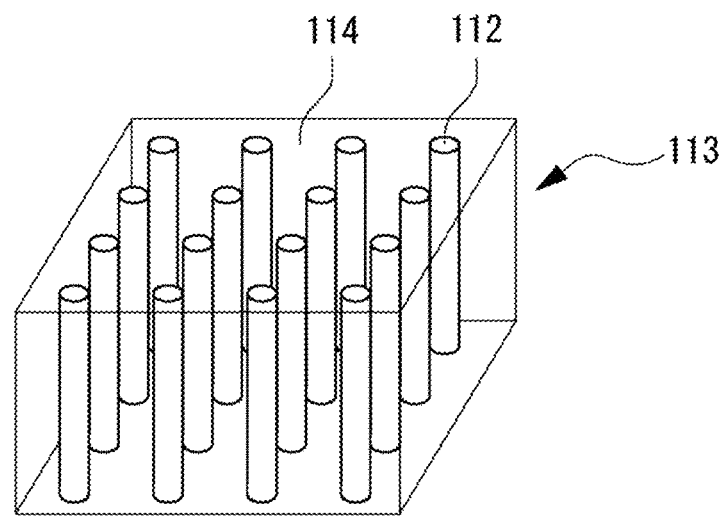
FIG. 2 is a perspective view schematically illustrating an example of a regular internal structure (column structure) of a light diffusion control layer in an embodiment of the present invention.

FIG. 2 is a perspective view schematically illustrating the above-described column structure. As illustrated in FIG. 2, the column structure 113 may be a structure in which a plurality of columnar bodies 112 having a relatively high refractive index is densely arranged to stand in the thickness direction and the surroundings thereof are filled with a region 114 having a relatively low refractive index. FIG. 2 depicts the columnar bodies 112 as existing in the entire thickness direction in the column structure 113, but the columnar bodies 112 may not exist at least in one of the upper end part and lower end part of the column structure 113 in the thickness direction.

When the light incident on a light diffusion control layer having such a column structure 113 falls within a predetermined incident angle range, the light exits the light diffusion control layer while being strongly diffused with a predetermined opening angle. On the other hand, when the incident light is at an angle that falls outside the above incident angle range, the incident light transmits through the light diffusion control layer without being diffused or exits the light diffusion control layer with weaker diffusion than that in the case of the incident light within the incident angle range. When an image creating body is arranged parallel to the surface of the light diffusion control layer, the diffused light caused by the column structure 113 has a circular shape or an approximately circular shape (elliptical shape or the like) that spreads in any direction.

In the column structure 113, the difference between the refractive index of the columnar bodies 112 having a relatively high refractive index and the refractive index of the region 114 having a relatively low refractive index may be preferably 0.01 or more, particularly preferably 0.05 or more, and further preferably 0.1 or more. When the above difference is 0.01 or more, effective diffusion can be performed. The upper limit of the above difference is not particularly limited and may be, for example, 0.3 or less.

Preferably, the above-described columnar bodies 112 may have a structure in which the diameter increases from one surface of the light diffusion control layer to the other surface. The columnar bodies 112 having such a structure may readily change the traveling direction of light parallel to the axial direction of the columnar bodies as compared with columnar bodies in which the diameter does not substantially change from one surface to the other surface. This allows the light diffusion control layer to effectively diffuse light.

The maximum value of the diameter in the cross sections when the columnar bodies 112 are cut along a horizontal plane with respect to the axial direction may be preferably 0.1 μm or more, particularly preferably 0.5 μm or more, and further preferably 1 μm or more. From another aspect, the maximum value may be preferably 15 μm or less, particularly preferably 10 μm or less, and further preferably 5 μm or less. When the maximum value of the diameter falls within the above range, the light diffusion control layer can effectively diffuse light. The cross-sectional shape of the columnar bodies 112 when cut along a plane perpendicular to the axial direction is not particularly limited, but may preferably be, for example, a circle, an ellipse, a polygonal shape, an irregular shape, or other similar shape.

In the column structure 113, the distance between adjacent columnar bodies 112 may be preferably 0.1 μm or more, particularly preferably 0.5 μm or more, and further preferably 1 μm or more. From another aspect, the above distance may be preferably 15 μm or less, particularly preferably 10 μm or less, and further preferably 5 μm or less. When the distance between adjacent columnar bodies 112 falls within the above range, the light diffusion control layer can effectively diffuse light.

In the column structure 113, the columnar bodies 112 may be densely arranged to stand parallel to the thickness direction of the light diffusion control layer or may also be densely arranged to stand at a certain tilt angle. The tilt angle when the columnar bodies 112 are densely arranged to stand at a certain tilt angle, that is, an angle on the acute angle side formed by the axis of each columnar body 112 of the column structure 113 and the normal line of the surface of the light diffusion control layer may be preferably 1° or more, particularly preferably 5° or more, and further preferably 10° or more. From another aspect, the above angle may be preferably 50° or less, particularly preferably 40° or less, and further preferably 30° or less. When the columnar bodies 112 are tilted within the above range, the light diffusion control layer having such a column structure 113 can diffuse the transmitted light while deflecting it in a desired direction.

The dimensions, predetermined angle, and other parameters relating to the regular internal structure of the column structure 113 described above can be measured by observing the cross section of the column structure 113 using an optical digital microscope.

(2) Modified Example of Column Structure

The regular internal structure of each light diffusion control layer according to the present embodiment may be a structure obtained by modifying the above-described column structure 113. For example, each light diffusion control layer may have, as the internal structure, a structure in which the columnar bodies 112 in the above-described column structure 113 are bent at the middle in the thickness direction of the light diffusion control layer. Additionally or alternatively, each light diffusion control layer may have a column structure 113 with two or more regions of columnar bodies having different tilt angles in the thickness direction of the light diffusion control layer.

3. Method of Manufacturing Light Diffusion Control Body

The method of manufacturing the light diffusion control body according to the present embodiment may include, for example, separately forming the first light diffusion control layer 11 and the second light diffusion control layer 12 and, if desired, one or more other layers such as a further light diffusion control layer and laminating these layers in a desired order. Another manufacturing method may include forming the first light diffusion control layer 11 and then forming the second light diffusion control layer 12 directly on the first light diffusion control layer 11.

The method of forming the first light diffusion control layer 11, the second light diffusion control layer 12, and a further light diffusion control layer is not particularly limited, and these layers can be formed using a conventionally known method. For example, the previously described composition for light diffusion control layers is applied to one surface of a process sheet to form a coating film, and one surface of a release sheet (in particular, the release surface) is then attached to the surface of the coating film opposite to the process sheet. Subsequently, the above coating film is irradiated with active energy rays to cure the coating film, and a light diffusion control layer can thereby be formed. Thus, by laminating the release sheet on the above coating film, a light diffusion control layer having a uniform thickness can readily be formed while maintaining the gap between the release sheet and the process sheet and suppressing the crushing of the coating film.

Examples of the method for the above-described application include a knife coating method, a roll coating method, a bar coating method, a blade coating method, a die coating method, and a gravure coating method. The composition for light diffusion control layers may be diluted using a solvent as necessary.

Irradiation of the coating film with the active energy rays may be performed in a different mode depending on the regular internal structure to be formed. Such irradiation can be performed using a conventionally known method. For example, when forming the previously described column structure, the coating film may be irradiated with parallel light having a high degree of parallelism of light rays.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

When forming the column structure using ultraviolet rays as the active energy rays, it may be preferred to set the irradiation condition such that the peak illuminance on the coating film surface is 0.1 to 10 mW/cm$^2$. The peak illuminance as referred to herein means a measured value at a portion at which the active energy rays irradiating the coating film surface show the maximum value. Additionally or alternatively, it may be preferred to set the integrated light amount on the coating film surface to 5 to 200 mJ/cm$^2$.

From the viewpoint of completing more reliable curing, it may also be preferred to perform the irradiation with commonly-used active energy rays (active energy rays for which the process of converting the rays into parallel light or strip-shaped light is not performed, scattered light) after performing the curing using the parallel light or strip-shaped light as previously described.

4. Use of Light Diffusion Control Body

The use of the light diffusion control body 1 according to the present embodiment is not particularly limited, and the light diffusion control body 1 can be used in the same manner as that for conventional light diffusion control bodies. In particular, the light diffusion control body 1 according to the present embodiment can be suitably used for manufacturing a reflective display body.

Figure 3:
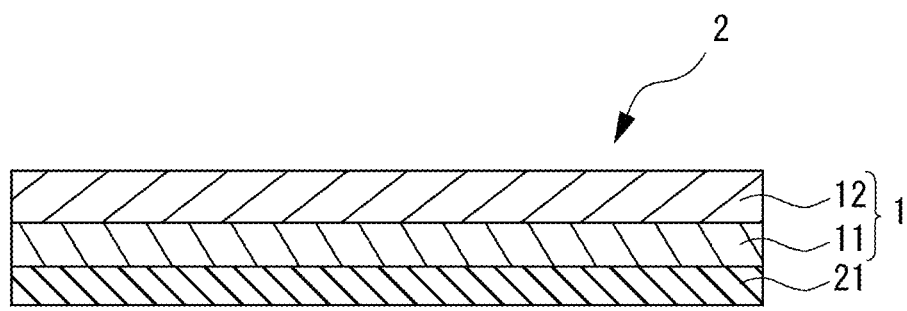
FIG. 3 is a cross-sectional view of a reflective display body including a light diffusion control body according to an embodiment of the present invention.

FIG. 3 illustrates a cross-sectional view of an example of a reflective display body 2 manufactured using the light diffusion control body 1 according to the present embodiment. The reflective display body 2 includes the light diffusion control body 1 according to the present embodiment and a reflective plate 21 provided on one surface side of the light diffusion control body 1.

The reflective display body 2 may include one or more layers or members in addition to the light diffusion control body 1 and the reflective plate 21. For example, a display panel such as a liquid crystal may be provided between the light diffusion control body 1 and the reflective plate 21. Alternatively, the reflective display body 2 may have a configuration in which the light diffusion control body 1 is provided on one surface side of a display panel, and the reflective plate 21 may be provided as one of members that constitute the display panel.

Examples of the reflective display body 2 include electronic devices such as a reflective liquid crystal display device, electronic paper, an electrophoretic display, a MEMS display, and a solid crystal display. Other than such an electronic device, the reflective display body 2 may be paper, a resin film, a metal plate, or the like on which the display content is printed. In this case, the paper, resin film, metal plate, or the like may serve as the reflective plate 21, or paper, a resin film, a metal plate, or the like on which the display content is printed may be provided between the light diffusion control body 1 and the reflective plate 21.

The light diffusion control body 1 according to the present embodiment can also be used for manufacturing a transmissive display body such as a transmissive liquid crystal display device or an organic EL display.

The light diffusion control body 1 according to the present embodiment includes the first light diffusion control layer 11 and the second light diffusion control layer 12 each having the minimum value of the previously described haze value and can thereby moderately diffuse light while preventing the light loss, such as due to the backscattered light and stray light. This allows the display body (in particular, the reflective display body 2) manufactured using the light diffusion control body 1 to achieve excellent visibility.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples etc., but the scope of the present invention is not limited to these examples etc.

Production Example 1 (Light Diffusion Control Layer A)

(1) Preparation of Composition for Light Diffusion Control Layers

Polyether urethane methacrylate having a weight-average molecular weight of 9,900 was obtained as the low refractive index component by reacting polypropylene glycol, isophorone diisocyanate, and 2-hydroxyethyl methacrylate. A composition for light diffusion control layers was obtained through adding 60 mass parts (solid content equivalent value, here and hereinafter) of o-phenylphenoxyethoxyethyl acrylate having a molecular weight of 268 as the high refractive index component and 8 mass parts of 2-hydroxy-2-methyl-1-phenylpropan-1-one as the photopolymerization initiator to 40 mass parts of the above low refractive index component and then heating and mixing them under a condition of 80° C.

(2) Formation of Light Diffusion Control Layer

The obtained composition for light diffusion control layers was applied to one surface of a long polyethylene terephthalate sheet as the process sheet to form a coating film. Subsequently, the release surface of a release sheet (available from LINTEC Corporation, product name "SP-PET381130," thickness: 38 μm) obtained by release treating one surface of a polyethylene terephthalate with a silicone-based release agent was laminated on the surface of the coating film opposite to the process sheet.

The laminate thus obtained and composed of the release sheet, the above coating film, and the process sheet was placed on a conveyor. At that time, the surface of the laminate on the release sheet side was on the upper side, and the longitudinal direction of the process sheet was made parallel to the flow direction of the conveyor. Then, an ultraviolet spot parallel light source (available from JATEC) having a controlled center beam parallelism within ±3° was installed on the conveyor on which the laminate was placed. At that time, the light source was installed so as to be able to emit parallel light in the normal direction of the surface of the laminate on the release sheet side.

Thereafter, while the conveyor was operated to move the laminate, the coating film in the laminate was cured by being irradiated with parallel light having a parallelism of 2° or less (UV light from a high-pressure mercury lamp having a main peak at a wavelength of 365 nm and other peaks at 254 nm, 303 nm, and 313 nm) under the conditions of a peak illuminance of 2.00 mW/cm$^2$ and an integrated light amount of 53.13 mJ/cm$^2$ on the coating film surface, and a light diffusion control layer A having a thickness of 60 μm was formed. As a result, a laminate was obtained in which the process sheet, the light diffusion control layer A (thickness: 60 μm), and the release sheet were laminated in this order.

When the cross section of the formed light diffusion control layer A was observed with a microscope or the like, it was confirmed that a column structure in which a plurality of columnar bodies was densely arranged to stand in the entire thickness direction was formed in the light diffusion control layer A. That is, the ratio of the column structure region extending in the thickness direction inside the obtained light diffusion control layer A was 100%. It was also confirmed that the above-described columnar bodies were parallel to the thickness direction of the light diffusion control layer A (tilt angle was 0°). In the present specification, provided that the vertically upward direction in the normal direction of the film surface is 0°, the tilt angle in the conveyor traveling direction is indicated as a positive value, and the tilt angle in the opposite direction is indicated as a negative value.

The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the above coating film. The thickness of the light diffusion control layer A was measured using a constant-pressure thickness meter (available from TAKARA SEISAKUSYO, product name "Teclock PG-02J").

Production Example 2 (Light Diffusion Control Layer B)

The composition for light diffusion control layers obtained in the same manner as in the step (1) of Production Example 1 was applied to one surface of a long polyethylene terephthalate sheet as the process sheet to form a coating film. The laminate thus obtained and composed of the coating film and the process sheet was placed on a conveyor. At that time, the surface of the laminate on the coating film side was on the upper side, and the longitudinal direction of the laminate was made parallel to the flow direction of the conveyor. Then, an ultraviolet spot parallel light source (available from JATEC) having a controlled center beam parallelism within ±3° was installed on the conveyor on which the laminate was placed. At that time, the light source was installed so as to be able to emit parallel light in a direction tilted by 10° in the flow direction of the conveyor with respect to the normal direction of the surface of the laminate on the coating film side.

Thereafter, while the conveyor was operated to move the laminate, the laminate was irradiated with parallel light having a parallelism of 2° or less (UV light from a high-pressure mercury lamp having a main peak at a wavelength of 365 nm and other peaks at 254 nm, 303 nm, and 313 nm) under the conditions of a peak illuminance of 2.00 mW/cm$^2$ and an integrated light amount of 53.13 mJ/cm$^2$ on the coating film surface.

Subsequently, the release surface of a release sheet (available from LINTEC Corporation, product name "SP-PET381130," thickness: 38 μm) obtained by release treating one surface of a polyethylene terephthalate with a silicone-based release agent was laminated on the surface of the above coating film opposite to the process sheet. The laminate thus obtained and composed of the release sheet, the coating film, and the process sheet was placed on a conveyor in the same manner as the above. Subsequently, an ultraviolet spot parallel light source was installed on the conveyor in the same manner as the above. Then, while the conveyor was operated to move the laminate, the laminate was irradiated with scattered light under the conditions of a peak illuminance of 11.00 mW/cm$^2$ and an integrated light amount of 32.0 mJ/cm$^2$ on the coating film surface.

The coating film in the laminate was cured as the above and a light diffusion control layer B having a thickness of 90 μm was formed. As a result, a laminate was obtained in which the process sheet, the light diffusion control layer B (thickness: 90 μm), and the release sheet were laminated in this order.

The ratio of the column structure region extending in the thickness direction inside the obtained light diffusion control layer B was 10%. In addition, it was confirmed that the above-described columnar bodies were tilted by about 7° (tilt angle of +7°) in the traveling direction of the conveyor with respect to the thickness direction of the light diffusion control layer B.

Production Example 3 (Light Diffusion Control Layer C)

A laminate in which the process sheet, a light diffusion control layer C (thickness: 120 μm), and the release sheet were laminated in this order was obtained in the same manner as in Production Example 2 except that the thickness of the formed light diffusion control layer was 120 μm.

The ratio of the column structure region extending in the thickness direction inside the obtained light diffusion control layer C was 30%.

Production Example 4 (Light Diffusion Control Layer D)

A laminate in which the process sheet, a light diffusion control layer D (thickness: 140 μm), and the release sheet were laminated in this order was obtained in the same manner as in Production Example 2 except that the thickness of the formed light diffusion control layer was 140 μm.

The ratio of the column structure region extending in the thickness direction inside the obtained light diffusion control layer D was 40%.

Production Example 5 (Light Diffusion Control Layer E)

A laminate in which the process sheet, a light diffusion control layer E (thickness: 160 μm), and the release sheet were laminated in this order was obtained in the same manner as in Production Example 2 except that the thickness of the formed light diffusion control layer was 160 μm.

The ratio of the column structure region extending in the thickness direction inside the obtained light diffusion control layer E was 50%.

Production Example 6 (Light Diffusion Control Layer F)

A laminate in which the process sheet, a light diffusion control layer F (thickness: 185 μm), and the release sheet were laminated in this order was obtained in the same manner as in Production Example 2 except that the thickness of the formed light diffusion control layer was 185 μm.

The ratio of the column structure region extending in the thickness direction inside the obtained light diffusion control layer F was 60%.

Example 1

The process sheet and the release sheet were released and removed from the laminate produced in each of Production Example 1 and Production Example 4, and the light diffusion control layer A and the light diffusion control layer D were obtained. Then, the surface of the light diffusion control layer D as the second light diffusion control layer opposite to the surface irradiated with ultraviolet rays was laminated on the surface irradiated with ultraviolet rays of the light diffusion control layer A as the first light diffusion control layer so that the longitudinal directions (moving directions of the conveyors) coincide with each other, and a light diffusion control body was thereby obtained.

Furthermore, the surface of the above light diffusion control body on the first light diffusion control layer (light diffusion control layer A) side and the reflection surface of a reflective plate (obtained by vapor-depositing aluminum to a thickness of 300 nm on the surface of a polyethylene terephthalate film having a thickness of 100 μm) were laminated with each other to obtain a sample of a reflective display body.

Example 2

A light diffusion control body and a sample of a reflective display body were obtained in the same manner as in Example 1 except that the light diffusion control layer E was acquired by releasing and removing the process sheet and the release sheet from the laminate produced in Production Example 5 and used as the second light diffusion control layer.

Example 3

A light diffusion control body and a sample of a reflective display body were obtained in the same manner as in Example 1 except that the light diffusion control layer F was acquired by releasing and removing the process sheet and the release sheet from the laminate produced in Production Example 6 and used as the second light diffusion control layer.

Comparative Example 1

A single layer of the first light diffusion control layer (light diffusion control layer A) was used as the light diffusion control body without providing the second light diffusion control layer. Furthermore, a sample of a reflective display body was obtained in the same manner as in Example 1 except that this light diffusion control body was used.

Comparative Example 2

A light diffusion control body and a sample of a reflective display body were obtained in the same manner as in Example 1 except that the light diffusion control layer B was acquired by releasing and removing the process sheet and the release sheet from the laminate produced in Production Example 2 and used as the second light diffusion control layer.

Comparative Example 3

A light diffusion control body and a sample of a reflective display body were obtained in the same manner as in Example 1 except that the light diffusion control layer C was acquired by releasing and removing the process sheet and the release sheet from the laminate produced in Production Example 3 and used as the second light diffusion control layer.

Testing Example 1 (Variable Haze Measurement for Light Diffusion Control Layers)

For the light diffusion control layers A to F produced respectively in Production Examples 1 to 6, the haze values (%) were measured using a variable haze meter (available from Toyo Seiki Seisaku-sho, Ltd., product name "Haze-Gard-Plus, Variable Haze Meter").

Specifically, in a single body of the light diffusion control layer obtained by releasing and removing the process sheet and the release sheet from the laminate obtained in each of Production Examples 1 to 6, the surface opposite to the surface irradiated with ultraviolet rays during the manufacturing was attached to one surface of an alkali-free glass plate (thickness: 1.1 mm) to obtain a laminate. Then, the laminate was installed so that the distance from the integrating sphere aperture in the above variable haze meter to the arrival position of the measurement light would be 62 mm and the alkali-free glass side would face the light source. Then, a change in the haze value (%) was measured by rotating the longitudinal direction of the light diffusion control layer (transport direction during the production) with the width direction of the light diffusion control layer at the above arrival position as a rotation axis. That is, only the tilt angle of the light diffusion control layer was changed thereby to vary the incident angle of the measurement light with respect to the light diffusion control layer, and the haze value (%) was measured at each incident angle. Provided that the incident angle of the measurement light in the normal direction of the laminate was 0° and the rotational direction in which the traveling direction side in the longitudinal direction of the light diffusion control layer (transport direction during the production) approached the light source gave a positive angle, the measurement was performed in the range of −70° to 70°. Details of the measurement conditions were as follows.

Figure 4:
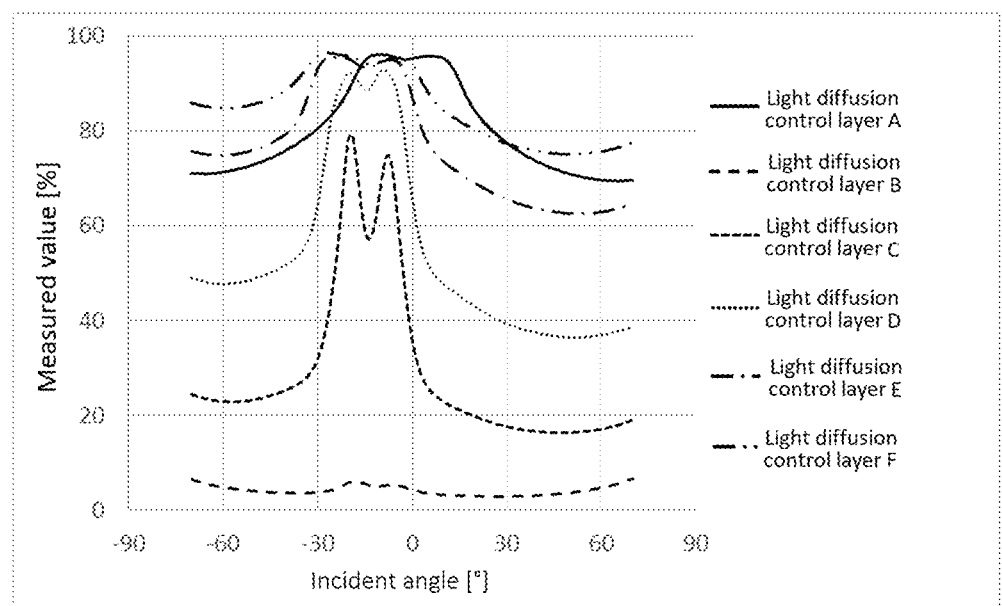
FIG. 4 is a diagram illustrating the results of Testing Example 1 (variable haze measurement for light diffusion control layers)

Light source: C light source
Measuring diameter: φ18 mm
Diameter of integrating sphere aperture: φ25.4 mm FIG. 4 illustrates the measurement results. In FIG. 4, the horizontal axis represents the incident angle and the vertical axis represents the measured value. In addition, among the measured haze values (%), the value when the incident angle was 0°, and the minimum value and the maximum value were specified. These results are listed in Table 1.

Furthermore, from the results of FIG. 4, the central axis of diffusion of the light diffusion control layer was specified as follows. In the graph of FIG. 4, when the incident angle is changed from a negative value to a positive value, the haze value rises and then decreases to the original level again. Here, the average value of the incident angle first giving a local maximum haze value during the rising and the incident angle giving another local minimum haze value immediately before the haze value decreased to the original level was calculated and this average value was used as the central axis of diffusion. In the graph of FIG. 4, there are two incident angles giving respective local maximum haze values and one incident angle giving a local minimum haze value between them, but the incident angle giving the local minimum haze value is not taken into consideration when specifying the central axis of diffusion. The central axes of diffusion thus obtained are also listed in Table 1.

Testing Example 2 (Diffuse Luminance Distribution Measurement for Light Diffusion Control Layers)

For the light diffusion control layers A to F produced respectively in Production Examples 1 to 6, the diffuse luminance distributions were measured using a diffuse luminance distribution measurement device (available from Suga Test Instruments Co., Ltd., product name "Variable-angle colour meter").

Specifically, in a single body of the light diffusion control layer obtained by releasing and removing the process sheet and the release sheet from the laminate obtained in each of Production Examples 1 to 6, the surface opposite to the surface irradiated with ultraviolet rays during the manufacturing was attached to one surface of an alkali-free glass plate (thickness: 1.1 mm) to obtain a laminate. The surface of the laminate on the alkali-free glass side was irradiated with the measurement light in the direction of the central axis of diffusion, and the light intensity of the diffused light transmitted to the other surface (surface on the light diffusion control layer side) by the irradiation with the measurement light was sequentially measured while moving the light receiver. In this measurement, the light receiver was moved in a state of facing the surface of the light diffusion control layer so as to rotate about the width direction of the light diffusion control layer including the light exit point of the diffused light (direction perpendicular to the longitudinal direction in the same plane) while keeping an equal distance from the light exit point. The movement was performed so that the angle (light receiver angle) formed by the line segment connecting the light exit point and the light receiver and the normal line passing through the light exit point was −45° to 45°. The value of the angle is positive when the light receiver is proximal with respect to the traveling direction side in the longitudinal direction of the light diffusion control layer (transport direction during the production), while when the light receiver is distal, the value of the angle is negative. A C light source was used as the light source.

Figures 1, 5:
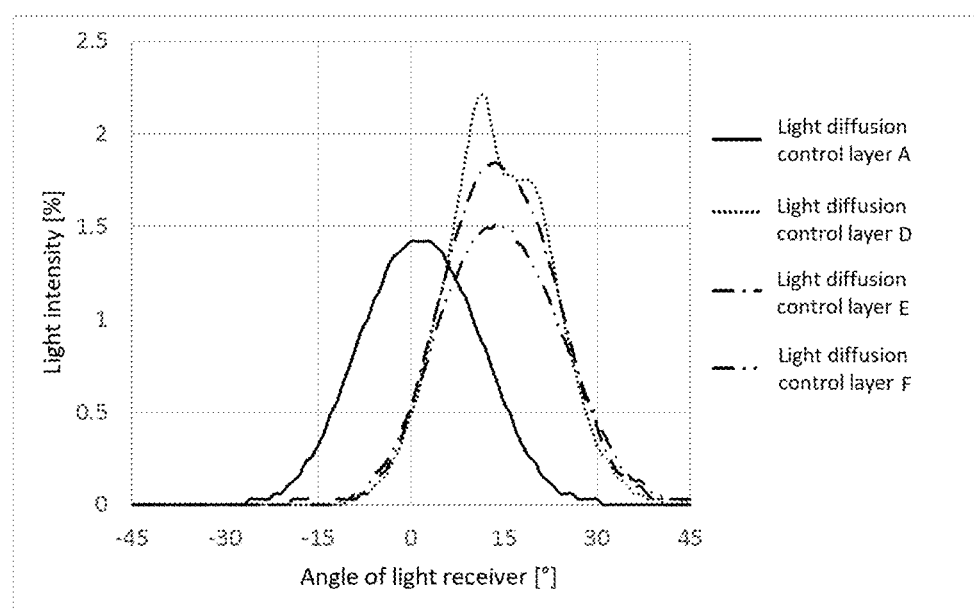
Figures 2, 5:
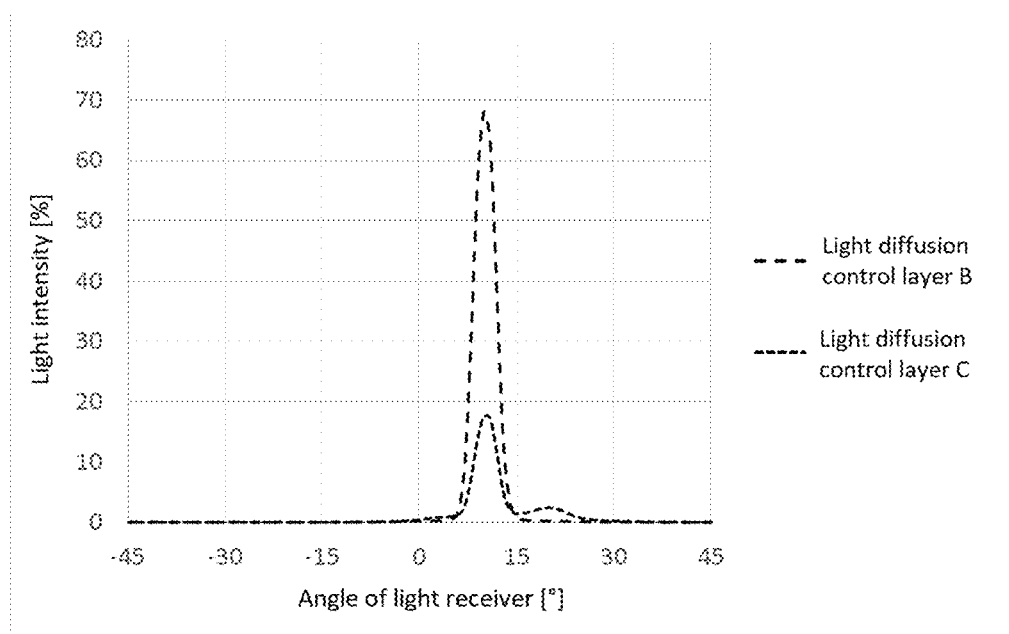

On the other hand, as a reference, the reference value of the light intensity was measured in a state of fixing the angle of the light receiver to 0° (state of irradiating the receiver directly with the measurement light) without installing a measurement target. Then, the ratio of the light intensity for each light diffusion control layer measured as described above to the reference value was calculated (the percentage of the above reference value being 100%). The results are illustrated in FIG. 5-1 and FIG. 5-2. In FIG. 5-1 and FIG. 5-2, the horizontal axis represents the angle of the light receiver and the vertical axis represents the light intensity (%). FIG. 5-1 illustrates the results for the light diffusion control layers A, D, E, and F and FIG. 5-2 illustrates the results for the light diffusion control layers B and C.

In addition, the maximum values of the obtained light intensity (%) were specified. The maximum values are listed in Table 1. Furthermore, the ratios of the maximum values of the light diffusion control layers A to F were calculated with reference to the maximum value of the light diffusion control layer A. These results are also listed in Table 1.

Testing Example 3 (Diffuse Luminance Distribution Measurement for Samples of Reflective Display Bodies)

For the samples of the reflective display bodies including the light diffusion control bodies obtained in Examples and Comparative Examples, the diffuse luminance distributions were measured using a diffuse luminance distribution measurement device (available from Suga Test Instruments Co., Ltd., product name "Variable-angle colour meter").

Specifically, the surface of each sample of the reflective display body on the light diffusion control body side was irradiated with light rays at an incident angle at which the angle formed with the normal line was 10° (incident angle of 10°), and the light intensity of the diffused light caused by the reflection at the sample of the reflective display body was sequentially measured while moving the light receiver. In this measurement, the light receiver was moved in a state of facing the light diffusion control layer so as to rotate about the width direction of the light diffusion control layer including the light exit point of the diffused light (direction perpendicular to the longitudinal direction in the same plane) while keeping an equal distance from the light exit point. The movement was performed so that the angle (light receiver angle) formed by the line segment connecting the light exit point and the light receiver and the normal line passing through the light exit point was −45° to 0°. The value of the angle is positive when the light receiver is proximal with respect to the traveling direction side in the longitudinal direction of the light diffusion control layer (transport direction during the production), while when the light receiver is distal, the value of the angle is negative. A C light source was used as the light source.

Figures 1, 6:
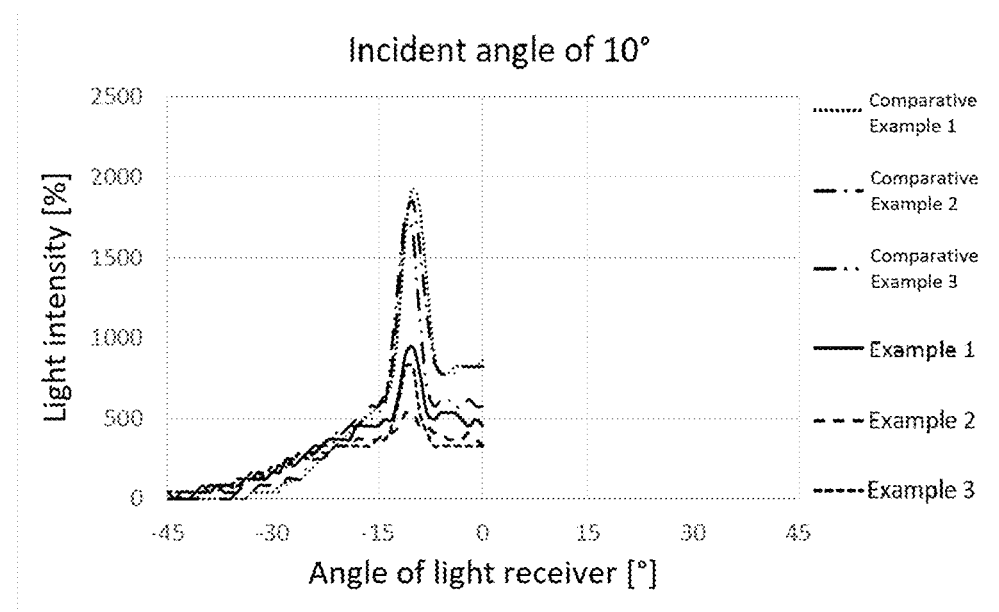
Figures 2, 6:
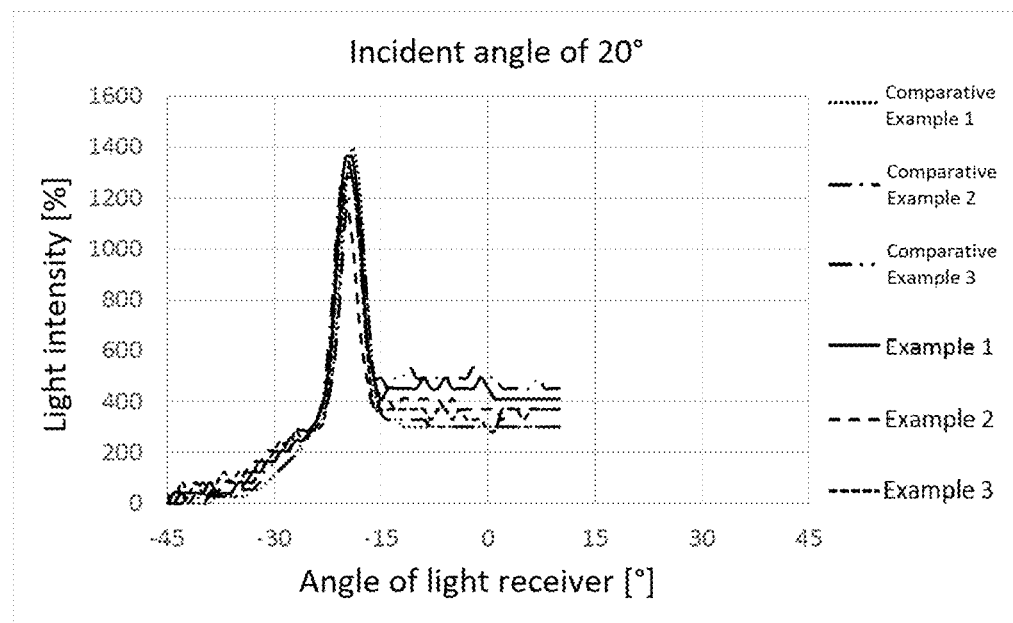
Figures 3, 6:
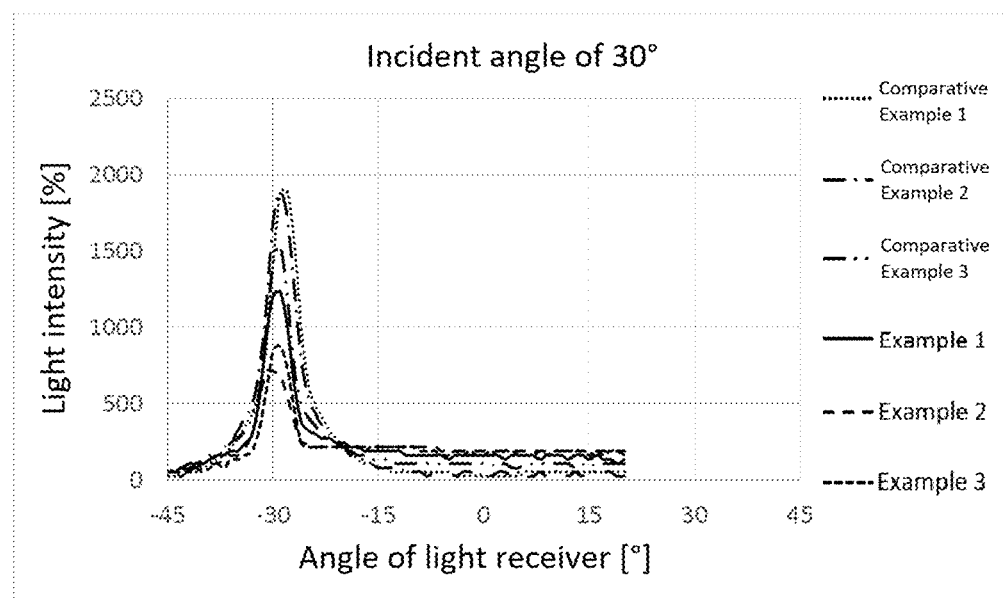
Figures 4, 6:
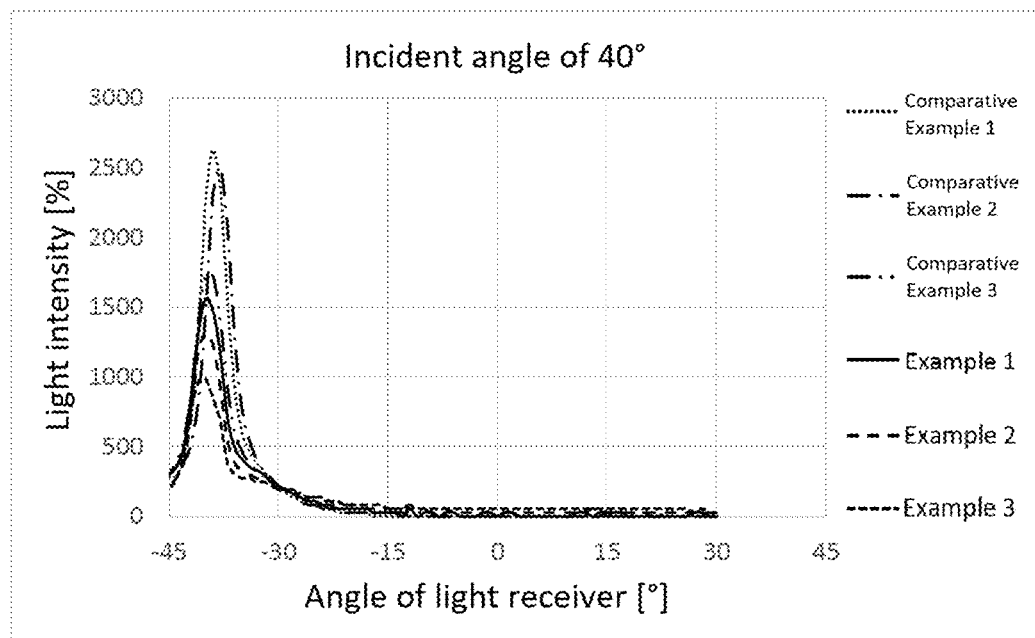

On the other hand, as a reference, a standard white calibration plate was installed as the measurement target, and the reference value of the light intensity was measured in a state of fixing the angle of the above light receiver to −45°. Then, the ratio of the light intensity for each sample of the light diffusion control body measured as described above to the reference value was calculated (the percentage of the above reference value being 100%). The results are illustrated in FIG. 6-1. In FIG. 6-1, the horizontal axis represents the angle of the light receiver and the vertical axis represents the light intensity (%). In addition, the values of the light intensity (%) when the angle of the light receiver is 0° are listed in Table 2.

Furthermore, the incident angle was changed to 20° (angle of light receiver: −45° to 10°), 30° (angle of light receiver: −45° to 20°), and 40° (angle of light receiver: −45° to 30°), and the diffuse luminance distribution measurement was performed in the same manner as the above. These measurement results are illustrated in FIGS. 6-2, 6-3, and 6-4. Also for the cases of changing the incident angle to 20°, 30°, and 40°, the values of the light intensity (%) when the angle of the light receiver is 0° are listed in Table 2.

Figure 7:
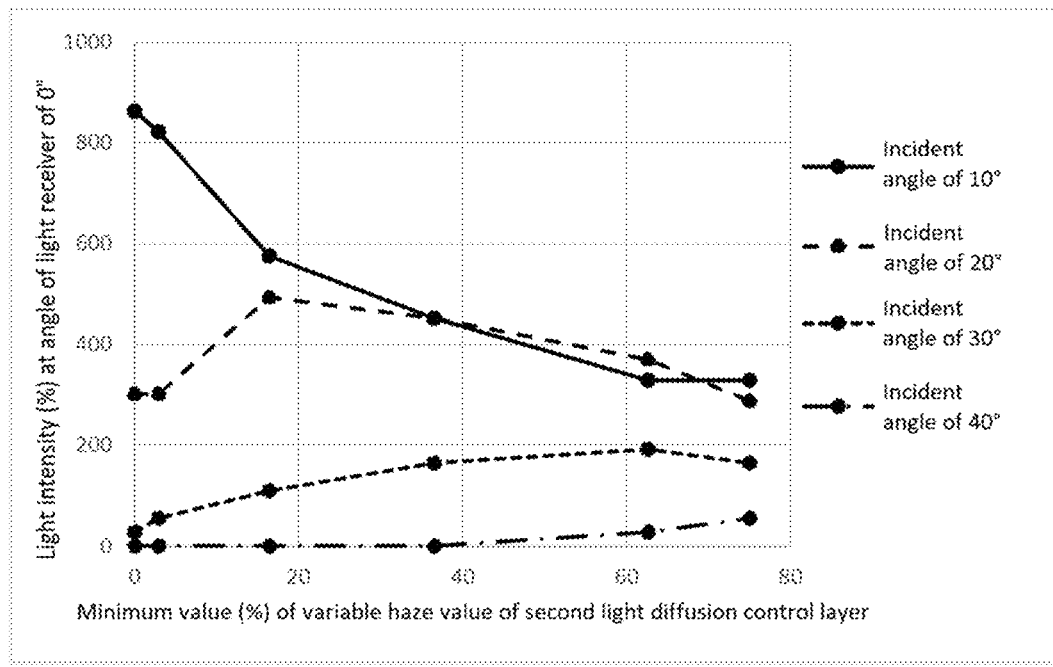
FIG. 7 is a diagram illustrating a graph obtained from the results of Testing Example 3 (diffuse luminance distribution measurement for samples of reflective display bodies).

In addition, on the basis of the light intensity (%) at the angle of the light receiver of 0° obtained as described above, a graph illustrating the relationship between the minimum value (%) of the variable haze value and the light intensity (%) for each incident angle was created. The graph is illustrated in FIG. 7. In the graph, the horizontal axis represents the minimum value (%) of the variable haze value of the second light diffusion control layer in each example, and the vertical axis represents the light intensity (%) when the angle of the light receiver is 0°. For Comparative Example 1 in which the second light diffusion control layer was not provided, the minimum value (%) of the variable haze value of the second light diffusion control layer was assumed to be "0%." Points having the same incident angle are connected by line segments.

Testing Example 4 (Evaluation of Visibility for Samples of Reflective Display Bodies)

The samples of reflective display bodies manufactured in Example 1, Example 2, and Comparative Example 3 were placed on a support table so that the surface on the light diffusion control body side was the upper side. Then, the surfaces of the samples were irradiated with light rays from a desk light at an incident angle at which the angle formed with the normal line was 10° (incident angle of 10°). Then, the brightness of the samples of reflective display bodies was visually observed from a position in front of the surfaces, and the samples of reflective display bodies were imaged with a digital still camera from the same position.

Figure 8:
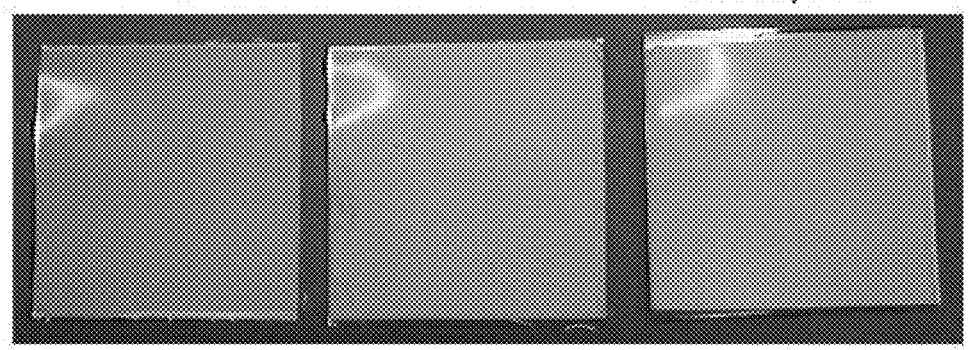
FIG. 8 is a diagram illustrating the results of Testing Example 4 (evaluation of visibility for samples of reflective display bodies).
Figure 8:
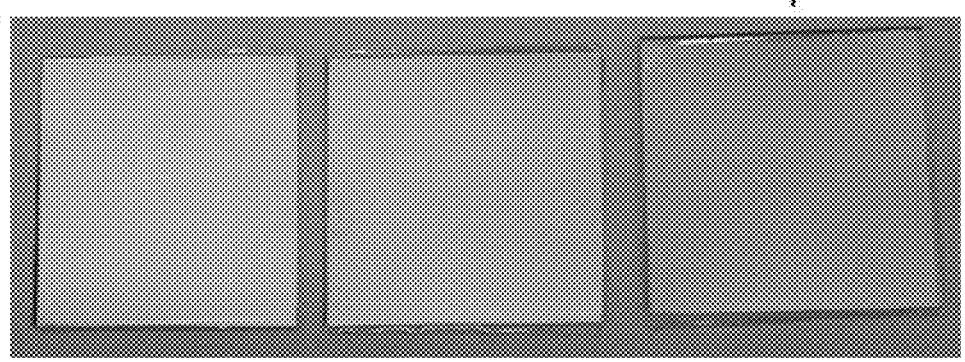

The obtained image is shown in FIG. 8. In addition, the incident angle was changed to 35°, the visual confirmation was performed in the same manner as the above, and the image was taken by the digital still camera. The obtained image is also shown in FIG. 8.

As apparent from FIG. 8, when the incident angle was 10°, the samples of reflective display bodies according to Example 1, Example 2, and Comparative Example 3 were all able to be visually recognized almost equally brightly. On the other hand, when the incident angle was 35°, the samples of reflective display bodies according to Example 1 and Example 2 were able to be visually recognized brightly, whereas the sample of reflective display body according to Comparative Example 3 was visually recognized darkly.

to Examples, it can be found that when the incident angle was 10° to 30°, the samples were able to reflect the light with sufficient light intensity in the front direction. In particular, it can be found that when the incident angle was 30°, the light intensity was around 100% or a value smaller than 100% in the samples of reflective display bodies according to Comparative Examples whereas the samples of reflective display bodies according to Examples were able to reflect the light in the front direction with the light intensity far beyond 100%. These results were in agreement with the evaluation results of visibility by visual observation of FIG. 8.

It can be found that when the incident angle was 40°, none of the samples of reflective display bodies according to Comparative Examples was able to reflect the light in the front direction whereas the samples of reflective display bodies according to Examples 2 and 3 were able to reflect the light in the front direction.

Moreover, according to the graph of FIG. 7, it can be found that when the incident angles are 10° and 20°, the samples can reflect the light with the light intensity of 100% or more irrespective of the minimum value of the variable haze value in the second light diffusion control layer, but

TABLE 1

| | Variable haze measurement | | | | Diffuse luminance distribution measurement | |
|---|---|---|---|---|---|---|
| | Value at incident angle of 0° (%) | Minimum value (%) | Maximum value (%) | Control axis of diffusion (°) | Maximum value of light intensity (%) | Ratio to light diffusion control layer A |
| Light diffusion control layer A | 95.2 | 69.4 | 96.1 | 0 | 1.42 | 1.00 |
| Light diffusion control layer B | 4.3 | 2.9 | 6.7 | 10 | 68.06 | 47.94 |
| Light diffusion control layer C | 36.0 | 16.4 | 79.1 | 10 | 17.57 | 12.37 |
| Light diffusion control layer D | 66.0 | 36.5 | 92.8 | 10 | 2.20 | 1.55 |
| Light diffusion control layer E | 87.2 | 62.5 | 95.5 | 10 | 1.84 | 1.30 |
| Light diffusion control layer F | 94.0 | 75.0 | 96.4 | 10 | 1.52 | 1.07 |

TABLE 2

| | Layer structure of light diffusion control body | | | | Light intensity at angle of light receiver of 0° (%) | | | |
|---|---|---|---|---|---|---|---|---|
| | First light diffusion control layer | | Second light diffusion control layer | | | | | |
| | Type | Minimum value of variable haze value (%) | Type | Minimum value of variable haze value (%) | Incident angle of 10° | Incident angle of 20° | Incident angle of 30° | Incident angle of 40° |
| Example 1 | Light diffusion control layer A | 69.4 | Light diffusion control layer D | 38.5 | 451.93 | 451.94 | 164.34 | 0 |
| Example 2 | Light diffusion control layer A | 69.4 | Light diffusion control layer E | 82.6 | 328.88 | 369.77 | 191.73 | 27.38 |
| Example 3 | Light diffusion control layer A | 69.4 | Light diffusion control layer F | 75.0 | 328.88 | 287.8 | 164.34 | 54.78 |
| Comparative Example 1 | Light diffusion control layer A | 69.4 | None | | 882.78 | 301.29 | 27.38 | 0 |
| Comparative Example 2 | Light diffusion control layer A | 69.4 | Light diffusion control layer B | 2.9 | 821.7 | 301.29 | 54.78 | 0 |
| Comparative Example 3 | Light diffusion control layer A | 69.4 | Light diffusion control layer C | 18.4 | 575.10 | 493.02 | 102.58 | 0 |

As listed in Table 2, in the samples of reflective display bodies including the light diffusion control bodies according when the incident angle is 30°, the samples can reflect the light with the light intensity of 100% or more if the minimum value of the variable haze value in the second light diffusion control layer is about 35% or more.

INDUSTRIAL APPLICABILITY

The light diffusion control body of the present invention may be suitably used for manufacturing a display body, in particular, a reflective display body.

DESCRIPTION OF REFERENCE NUMERALS

1 . . . Light diffusion control body
   11 . . . First light diffusion control layer
   12 . . . Second light diffusion control layer
112 . . . Columnar bodies having a relatively high refractive index
113 . . . Column structure
114 . . . Region having a relatively low refractive index
2 . . . Reflective display body
   21 . . . Reflective plate

The invention claimed is:

1. A light diffusion control body comprising
at least two light diffusion control layers each having a regular internal structure, the regular internal structure comprising a plurality of regions having a relatively high refractive index in a region having a relatively low refractive index,
the at least two light diffusion control layers are laminated to each other,
the at least two light diffusion control layers including a first light diffusion control layer and a second light diffusion control layer each having a minimum value of a haze value of 35% or more, the haze value being measured when one surface of each of the first light diffusion control layer and the second light diffusion control layer is irradiated sequentially with a light ray at an incident angle of −70° to 70° with respect to a normal direction of the surface being 0°,
a difference between a haze value of the first light diffusion control layer and a haze value of the second light diffusion control layer is 5 points or less, the haze value in the difference being measured when each light diffusion control layer is irradiated with light rays at an incident angle of 0°.

2. The light diffusion control body according to claim 1, wherein the first light diffusion control layer and the second light diffusion control layer have respective central axes of diffusion at different angles.

3. The light diffusion control body according to claim 2, wherein the regular internal structure in at least one of the first light diffusion control layer and the second light diffusion control layer is a column structure configured such that a plurality of columnar bodies having the relatively high refractive index is densely arranged to stand in a film thickness direction in the region having the relatively low refractive index.

4. A reflective display body comprising:
the light diffusion control body according to claim 3; and
a reflective plate provided on one surface side of the light diffusion control body.

5. A reflective display body comprising:
the light diffusion control body according to claim 2; and
a reflective plate provided on one surface side of the light diffusion control body.

6. The light diffusion control body according to claim 1, wherein the regular internal structure in at least one of the first light diffusion control layer and the second light diffusion control layer is a column structure configured such that a plurality of columnar bodies having the relatively high refractive index is densely arranged to stand in a film thickness direction in the region having the relatively low refractive index.

7. A reflective display body comprising:
the light diffusion control body according to claim 6; and
a reflective plate provided on one surface side of the light diffusion control body.

8. A reflective display body comprising:
the light diffusion control body according to claim 1; and
a reflective plate provided on one surface side of the light diffusion control body.

9. The light diffusion control body according to claim 1, wherein the first light diffusion control layer and a second diffusion control layer each have different haze values.

* * * * *